(12) United States Patent
Enomoto et al.

(10) Patent No.: US 8,827,462 B2
(45) Date of Patent: Sep. 9, 2014

(54) IMAGE DISPLAY APPARATUS HAVING HEAT DISSIPATER

(75) Inventors: Hirofumi Enomoto, Kumamoto (JP); Kohei Suyama, Fukuoka (JP); Yoshihiro Teshima, Fukuoka (JP); Nobuo Jikuya, Kumamoto (JP)

(73) Assignee: Panasonic Corporation, Osaka (JP)

( * ) Notice: Subject to any disclaimer, the term of this patent is extended or adjusted under 35 U.S.C. 154(b) by 342 days.

(21) Appl. No.: 13/364,600

(22) Filed: Feb. 2, 2012

(65) Prior Publication Data

US 2012/0307212 A1 Dec. 6, 2012

(30) Foreign Application Priority Data

May 31, 2011 (JP) ................. 2011-121367

(51) Int. Cl.
| | |
|---|---|
| G03B 21/16 | (2006.01) |
| F28F 1/30 | (2006.01) |
| G03B 21/14 | (2006.01) |
| G03B 29/00 | (2006.01) |
| G03B 21/20 | (2006.01) |

(52) U.S. Cl.
CPC . *G03B 21/16* (2013.01); *F28F 1/30* (2013.01); *G03B 21/145* (2013.01); *G03B 29/00* (2013.01); *G03B 21/2033* (2013.01)
USPC ............... 353/52; 353/60; 353/61; 353/119; 165/182

(58) Field of Classification Search
USPC ............ 353/52, 57, 61, 60, 31, 119; 165/151, 165/182
See application file for complete search history.

(56) References Cited

U.S. PATENT DOCUMENTS

| | | | |
|---|---|---|---|
| 5,396,403 | A | 3/1995 | Patel |
| 2005/0030494 | A1 | 2/2005 | Kumai |
| 2010/0045941 | A1 | 2/2010 | Chen |
| 2011/0304829 | A1 | 12/2011 | Enomoto et al. |
| 2012/0057136 | A1* | 3/2012 | Enomoto et al. ............... 353/61 |

FOREIGN PATENT DOCUMENTS

| | | |
|---|---|---|
| JP | 2008-233719 | 10/2008 |
| JP | 2009-181098 | 8/2009 |
| JP | 2009-288469 | 12/2009 |
| JP | 2010-32796 | 2/2010 |
| JP | 4636212 B1 | 12/2010 |
| WO | 2010/116444 | 10/2010 |

OTHER PUBLICATIONS

Search report from E.P.O., mail date is May 30, 2012.

* cited by examiner

*Primary Examiner* — Georgia Y Epps
*Assistant Examiner* — Magda Cruz
(74) *Attorney, Agent, or Firm* — Greenblum & Bernstein, P.L.C.

(57) ABSTRACT

The present invention provides an image display apparatus that inhibits deterioration of image quality caused by an increase in temperature of a laser light source apparatus. The image display apparatus of the present invention has a green color laser light source apparatus, a red color laser light source apparatus, a blue color laser light source apparatus, and a projection mouth in a first case. The first case has a fin on a side surface opposite to a projection mouth of the first case. The fin is provided in an air passage, the fin dissipating heat generated from laser light source apparatuses of each color and transferred via the first case.

9 Claims, 9 Drawing Sheets

Air flow direction

Air flow direction

IMAGE DISPLAY APPARATUS HAVING HEAT DISSIPATER

CROSS-REFERENCE TO RELATED APPLICATIONS

The present application claims priority under 35 U.S.C.§119 of Japanese Application No. 2011-121367, filed on May 31, 2011, the disclosure of which is expressly incorporated by reference herein in its entirety.

BACKGROUND OF THE INVENTION

1. Field of the Invention

The present invention relates to an image display apparatus in which a laser light source apparatus using a semiconductor laser is incorporated.

2. Description of Related Art

In recent years, laser light has drawn attention as a light source of an image display apparatus which can perform large-screen display, and technology development of a semiconductor laser has been facilitated to form this laser light. Compared with an ultra-high pressure mercury lamp (UHP lamp) conventionally used as a light source of an image display apparatus or a light-emitting diode (LED) recently used in a small-sized image display apparatus, a light source using a semiconductor laser light source has advantages including good color reproducibility, instant light up, long life, and high efficiency in electrical/optical conversion.

Hereinafter, a conventional laser light source apparatus is explained. As described in Japanese Patent Laid-open Publication No. 2010-32796, for example, the conventional light source apparatus has a red color laser light source, a blue color laser light source, and a green color laser light source as short-wavelength laser light sources which consecutively emit red color (R) laser light, blue color (B) laser light, and green color (G) laser light, respectively. The red color laser light source and the blue color laser light source are semiconductor lasers that emit red color laser light and blue color laser light, respectively. The green color laser light source has a configuration in which wavelength conversion is performed on laser light of the semiconductor laser so as to emit green color laser light.

The above-described conventional image display apparatus uses three colors of laser light as light sources, and projects images having good color reproducibility. In the conventional image display apparatus, however, quality of projected images deteriorates due to an increase in temperature of the laser light sources when the conventional image display apparatus is operated for a long period of time.

The three laser light sources each have different temperature characteristics. Basically, an increase in temperature of a laser light source causes a decrease in its light output. Light output of a red color laser light source apparatus particularly decreases in association with a temperature increase. Thus, the light output of the red color laser light source apparatus is likely to become weak as the temperature increases when the conventional image display apparatus is operated for a long period of time. As one color, for example, of three color laser light becomes weak in this way, the conventional image display apparatus cannot output images of high quality due to an imbalance in color.

SUMMARY OF THE INVENTION

An advantage of the present invention is to provide an image display apparatus that inhibits deterioration in image quality caused by a temperature increase in a laser light source apparatus. In order to provide the advantage, an image display apparatus of the present invention includes: a first case having a box shape; a second case housing the first case; a first, a second, and a third light source being held by the first case and each emitting laser light having an emission wavelength different from one another; a projection mouth externally irradiating light output from the first to the third light sources provided in the first case; a heat dissipater held by the first case; and an air passage being provided inside the second case and being capable of guiding air that cools an interior of the second case. The heat dissipater is positioned in the air passage. In this configuration, the heat dissipater is directly attached to the case of the image display apparatus. Thus, in addition to heat dissipation by a cooling fan provided to each laser light source apparatus, heat transferred to the case of the image display apparatus from each of laser holders for the respective laser light source apparatuses of each color is quickly transferred to the heat dissipater by use of the case of the image display apparatus. Thus, it is possible to prevent an increase in temperature of the laser light source apparatuses due to a long period of operation and thus to prevent a decrease in light output of the laser light sources. Accordingly, deterioration in image quality of the image display apparatus is inhibited. That is, it is possible for the image display apparatus to inhibit deterioration in quality of a projected image and to stably output an image of high quality.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Hereinafter, an image display apparatus of the present invention is described with reference to the drawings. An embodiment described hereinafter is a preferred example of the present invention and describes limitations of preferred technical conditions. However, the scope of the present invention is not limited by those conditions unless the present invention is specifically limited in the following descriptions.

Figure 1:
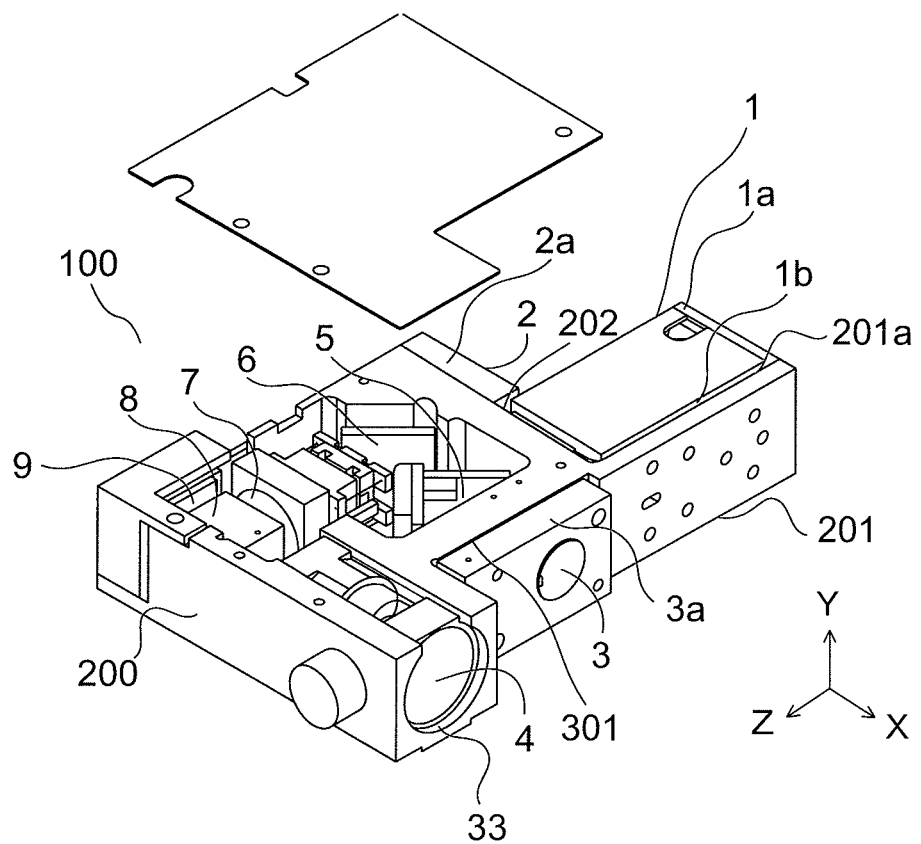
FIG. 1 is a schematic perspective view of an image display apparatus main body according to an embodiment of the present invention.

First, a configuration of an image display apparatus main body is explained with reference to FIG. 1. FIG. 1 is a schematic perspective view of the image display apparatus main body according to the embodiment of the present invention. In FIG. 1, an image display apparatus main body 100 uses laser light as a light source and projects the laser light on a screen after magnification. The image display apparatus main body 100 has three light sources: a green color laser light source apparatus 1 (first laser light source); a red color laser light source apparatus 2 (second laser light source); and a blue color laser light source apparatus 3 (third laser light source). The image display apparatus main body 100 displays an image with the laser light source apparatuses 1 to 3 of respective colors.

The green color laser light source apparatus 1 mainly outputs green color laser light by converting non-visible infrared fundamental laser light to a half wavelength laser light. A green color laser holder 1a is a case for the green color laser light source apparatus 1 and also fixes each element (for example, a semiconductor laser (first laser element) that outputs infrared fundamental laser light) that is stored in the green color laser holder 1a.

The red color laser light source apparatus 2 outputs red color laser light, and a red color laser holder 2a is a case for the red color laser light source apparatus 2. The red color laser holder 2a retains a semiconductor laser (second laser element) that outputs red color laser light.

The blue color laser light source apparatus 3 outputs blue color laser light, and a blue color laser holder 3a is a case for the blue color laser light source apparatus 3. The blue color laser holder 3a retains a semiconductor laser (third laser element) that outputs blue color laser light.

Herein, detailed explanation is given to arrangements of the green color laser light source apparatus 1, the red color laser light source apparatus 2, and the blue color laser light source apparatus 3. The blue color laser light source apparatus 3 is provided to a surface of a case 200 where a projecting lens 4 is retained, the case 200 acting as a first case. Laser light from the blue color laser light source apparatus 3 is guided to the interior of the case 200. The blue color laser holder 3a of the blue color laser light source apparatus 3 is attached to a side surface 301 of the case 200 so as to be in contact with the case 200 with no gap in-between, thereby facilitating dissipation of generated heat.

The green color laser light source apparatus 1 and the red color laser light source apparatus 2 are provided to a side surface 202 side, the side surface 202 being perpendicular to the side surface 301 on which the blue color laser light source apparatus 3 is provided. The case 200 here has a box-like shape such as a rectangular prism. The case 200 has a protrusion 201 extending the surface where the projecting lens 4 and the blue color laser light source apparatus 3 are provided, toward a side where the green color laser light source apparatus 1 is provided. In other words, the protrusion 201 is integrally provided with the case 200 at a corner of the case 200. Further, the protrusion 201 may be provided as a separate member from the case 200; however, an integrally provided protrusion 201 is preferable because it facilitates heat dissipation.

Elements such as an SHG (Second Harmonic Generation) element and a semiconductor laser are provided inside the green color laser light source apparatus 1 and fixed by the green color laser holder 1a. The green color laser holder 1a is installed such that a fixing surface 1b thereof is in contact with a surface 201a of the protrusion 201. The surface 201a of the protrusion 201 is a surface that is in contact with the fixing surface 1b. The green color laser light source apparatus 1 has an element generating a great amount of heat. Thus, in order not to directly transfer the heat to a side surface 202 of the case 200, the green color laser light source apparatus 1 is not in contact with the side surface 202 of the case 200 and a predetermined gap (0.5 mm or less in this embodiment) is provided.

The reason why the predetermined gap is set to be 0.5 mm or less in this embodiment is as follows. As the size of the predetermined gap increases, the entire image display apparatus becomes larger. Further, the distance between the green color laser light source apparatus 1 and a collimator lens (not shown in the drawing) increases, which causes diffusion of green color laser light before reaching the collimator lens. Thus, light use efficiency is deteriorated.

When heat dissipation of the image display apparatus main body 100 can be sufficiently performed, however, the green color laser light source apparatus 1 may be installed so as to be in contact with the side surface 202 of the case 200. Thereby, it becomes easier to miniaturize the image display apparatus main body 100 and to effectively utilize a space. The red color laser holder 2a of the red color laser light source apparatus 2 is installed so as to be in contact with the side surface 202 of the case 200 with no gap in-between, thereby facilitating dissipation of generated heat. Further, since the red color laser light source apparatus 2 requires a margin of 0.3 mm or so for an optical axis adjustment, a gap of 0.3 mm or more is provided between the green color laser light source apparatus 1 and the red color laser light source apparatus 2. Thereby, as described later, heat from the green color laser light source apparatus 1 becomes less likely to be transferred to the red color laser light source apparatus 2. Thus, the red color laser light source apparatus 2 having undesirable temperature characteristics can be stably operated.

Dichroic mirrors 5 and 6 guiding optical paths are each configured by forming a film on a surface thereof, the film transmitting or reflecting laser light having a predetermined wavelength. A field lens 7 converts diffused laser light into a converging laser. A PBS (Polarized Beam Splitter) 8 reflects laser light of each color and directs it to a spatial light modulator 9.

The spatial light modulator 9 adjusts deflection of the laser light of each color to form an image. The spatial light modulator 9 used in this embodiment is reflective-type liquid crystal. Then, a large-screen image is projected after passing through the projecting lens 4. The laser light of each color from the respective laser light source apparatus 1 to 3 of each color is collimated by the respective collimator lens. The collimated laser light of each color is guided toward a diffusing plate by the dichroic mirrors 5 and 6; is transmitted through the diffusing plate, the field lens 7, and the PBS 8 in this order; is reflected on the spatial light modulator 9; is magnified by the projecting lens 4; and is projected onto a screen from a projection mouth 33 provided to the case 200.

Figure 2:
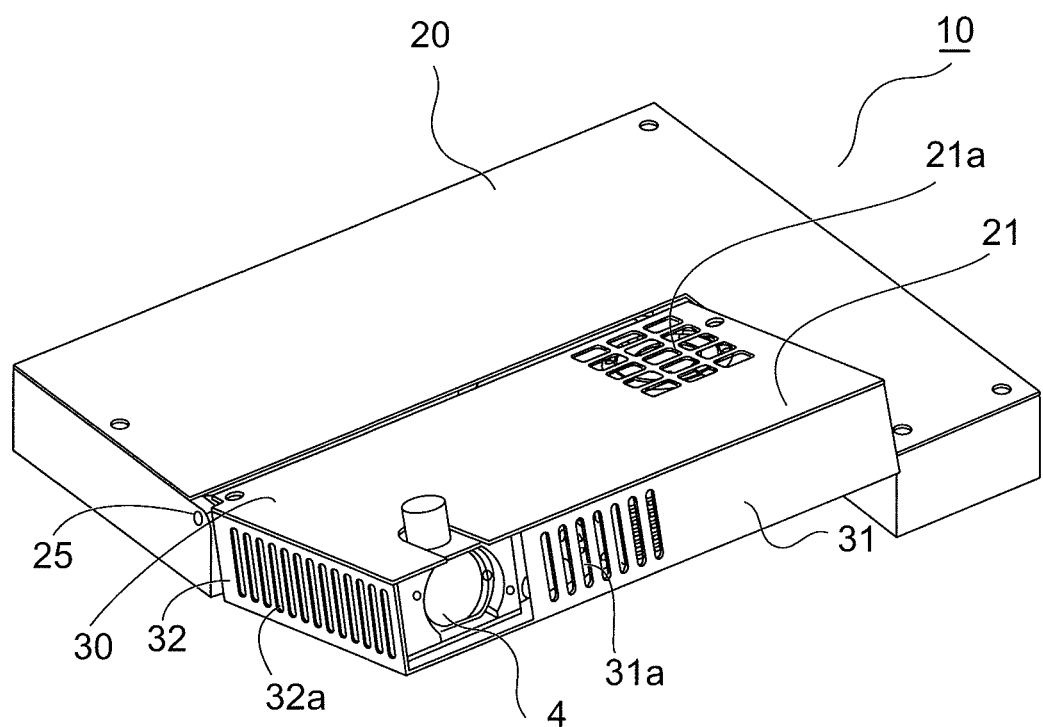
FIG. 2 is a schematic perspective view of a tilted state of an image display apparatus according to the embodiment of the present invention.

FIG. 2 is a schematic perspective view of a tilted state of the image display apparatus according to the embodiment of the present invention. As shown in FIG. 2, an image display apparatus 10 is configured with a fixed portion 20 and a tilted portion 30. The tilted portion 30 acts as a second case and is provided to be rotatable with respect to the fixed portion 20 by pivoting on a hinge (rotation axis) 25. In other words, the tilted portion 30 can rotate around an axis perpendicular to a direction in which the image display apparatus main body 100 projects an image and a direction A (see FIG. 3) in which a cooling fan 23 (see FIG. 3) takes in cooling air. Accordingly, a projection angle of the projecting lens 4 is adjustable.

The tilted portion 30 houses the cooling fan 23 (see FIG. 3), the image display apparatus main body 100 (see FIGS. 1 and 3), and the like, and pivots in a vertical direction on the hinge (rotation axis) 25. Thus, reflection or incompleteness can be prevented for an image projected by the projecting lens 4 on a placement surface of the image display apparatus 10.

Figure 3:
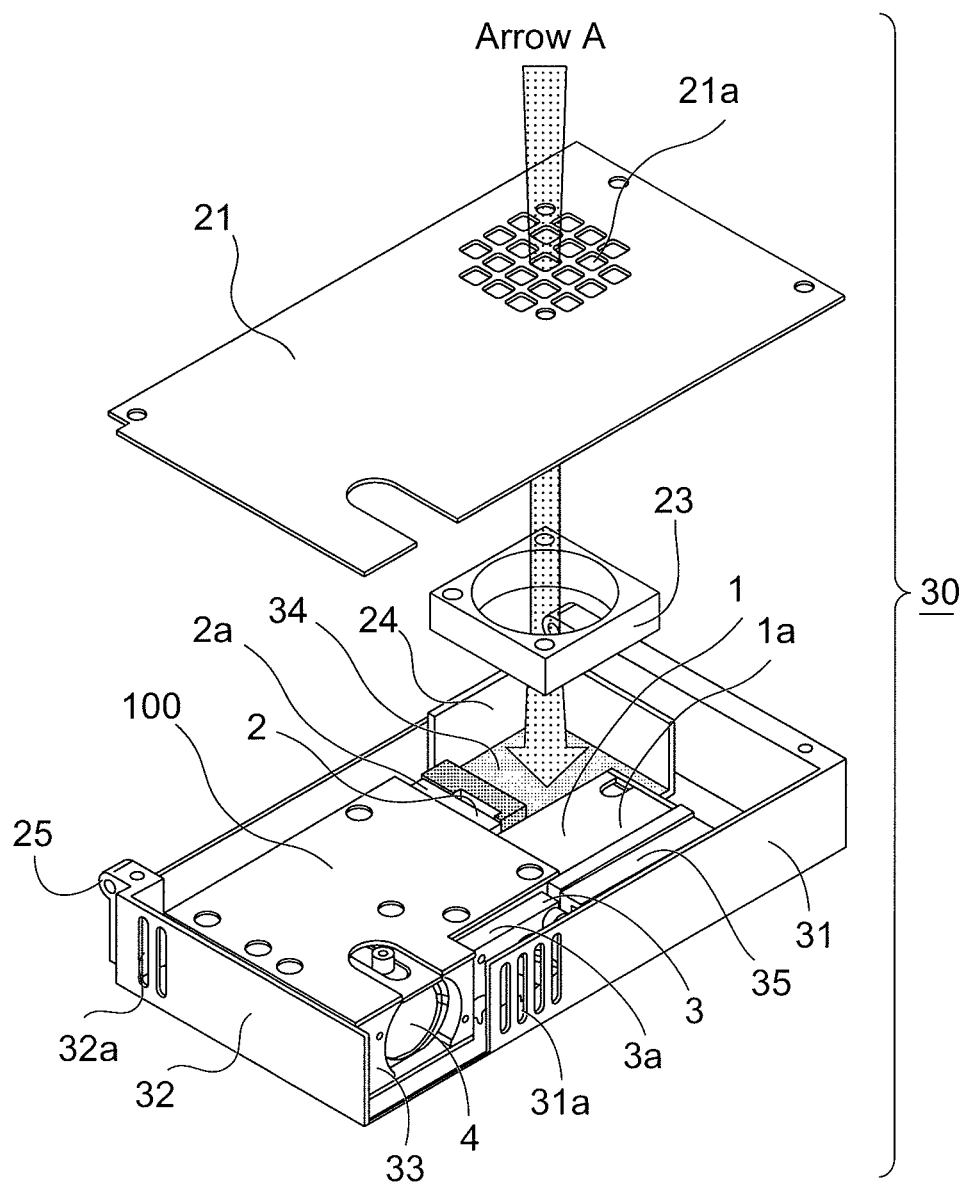
FIG. 3 is a schematic perspective view illustrating an internal configuration of the image display apparatus according to the embodiment of the present invention.
Figure 4:
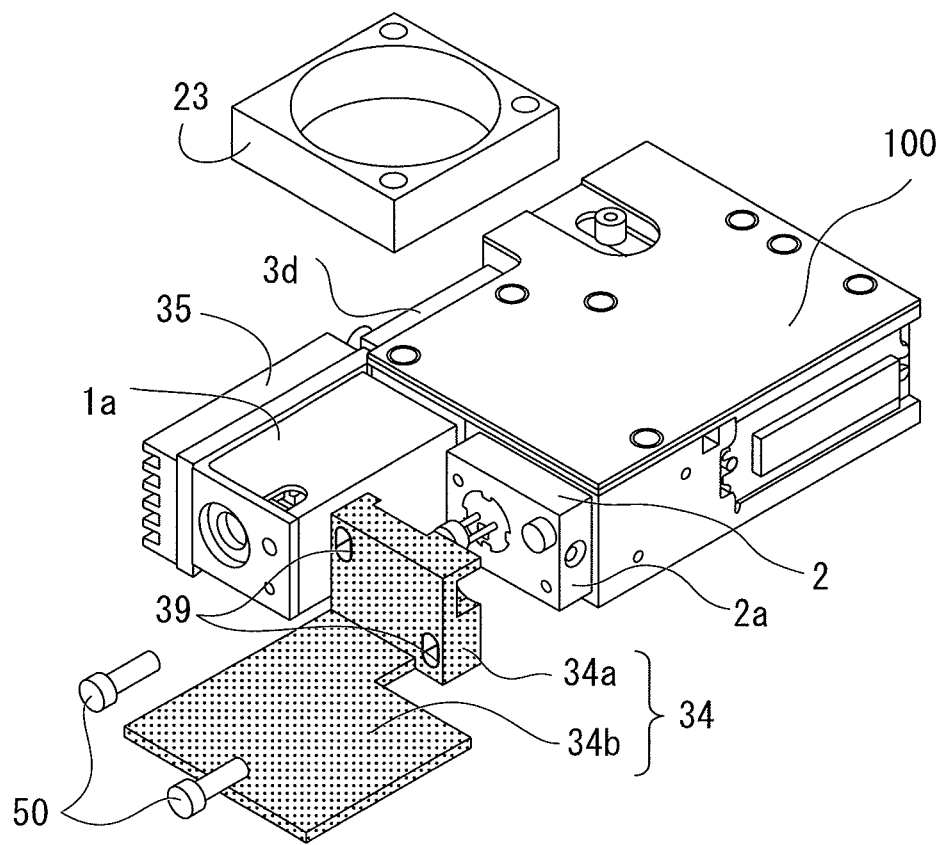
FIG. 4 is a schematic assembly view illustrating an internal assembly of the image display apparatus according to the embodiment of the present invention.
Figure 5:
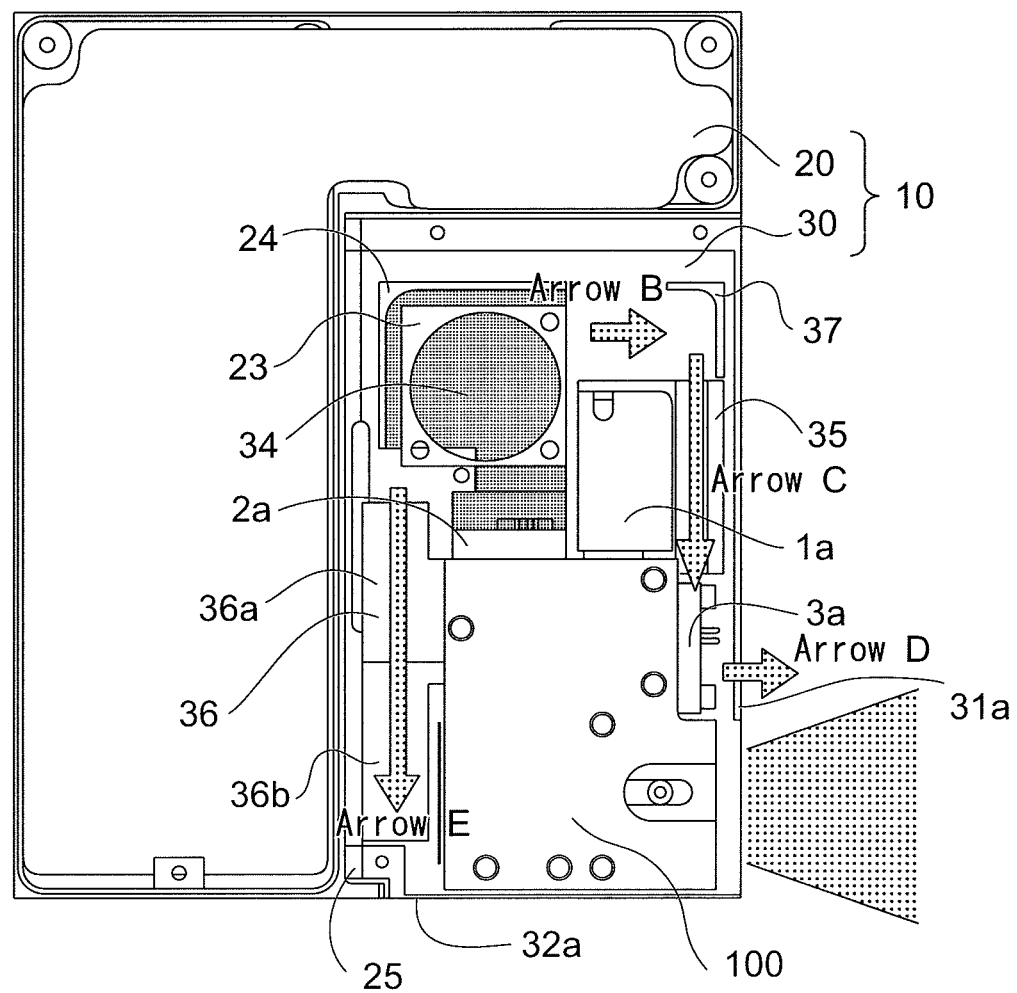
FIG. 5 illustrates an example of a cooling air passage of the image display apparatus according to the embodiment of the present invention.

Next, a schematic internal configuration of the image display apparatus 10 will be explained with reference to FIGS. 3 to 5. FIG. 3 is a schematic perspective view illustrating the internal configuration of the image display apparatus according to the embodiment of the present invention. FIG. 4 is a schematic assembly view illustrating an internal assembly of the image display apparatus according to the embodiment of the present invention. FIG. 5 illustrates an example of a cooling air passage of the image display apparatus according to the embodiment of the present invention.

As shown in FIG. 3, the tilted portion 30 houses the image display apparatus main body 100, which has been explained with FIG. 1, the cooling fan 23, a fin, and the like. The cooling fan 23 shown in FIGS. 3 to 5 has an air-blowing fan, which is not shown in the drawings, inside a tubular portion thereof.

A plurality of air inlet ports 21a is provided to an upper surface 21 of the tilted portion 30. A plurality of exhaust ports 31a are provided to a side surface 31 of the tilted portion 30. A plurality of exhaust ports 32a are provided to a side surface 32 of the tilted portion 30. The projection mouth 33, which projects an image, is provided to the side surface 31 of the tilted portion 30. The projecting lens 4 is exposed from the projection mouth 33 to the exterior of the image display apparatus 10.

The cooling fan 23, which is housed in the tilted portion 30, takes in and releases cooling air to facilitate dissipation of heat inside the image display apparatus 10. The cooling fan 23 rotates when supplied with power, takes in cooling air from the exterior of the image display apparatus 10 from the plurality of air inlet ports 21a side, and sends the cooling air in a direction of an arrow A.

The cooling air flows from a space between the cooling fan 23 and a bottom surface 34b of a fin 34 to the exhaust ports 31a and 32a, and is discharged through the exhaust ports 31a and 32a. Heat dissipaters of the laser light source apparatuses 1 to 3 of each color housed in the tilted portion 30 are arranged in a cooling air passage of the cooling air. Dissipation of heat from the laser light source apparatuses 1 to 3 of each color is thus facilitated. In this example, a cooling air passage on an air inlet ports 21a side is referred to as an upstream, and a cooling air passage on exhaust ports 31a and 32a sides is referred to as a downstream. Further, the air inlet port 21a, the exhaust port 31a, and the exhaust port 32a are each configured with a plurality of vent holes in the embodiment, however, they may be configured with a single vent hole. The shape of the air inlet port 21a, the exhaust port 31a, and the exhaust port 32a may be circular, oval, or polygonal, and it is not limited to a particular shape.

The air inlet ports 21a are provided on an upper surface of the tilted portion 30 in the embodiment. Alternatively, the air inlet ports may be provided on a lower surface of the tilted portion 30 so as to configure a required cooling air passage with an altered arrangement of the cooling fan and an altered shape of the fin.

The cooling fan 23 is arranged under (in a perpendicular direction to) the air inlet ports 21a and is installed to a surface to which the inlet ports 21a are provided so as to have a distance with respect to the bottom surface 34b (see FIG. 4) of the fin 34. In other words, the cooling fan 23 is installed between the air inlet ports 21a and the bottom surface 34b of the fin 34.

The red color laser light source apparatus 2 generally has the poorest temperature characteristics (explained in detail later) among the laser light source apparatuses 1 to 3 of each color (see FIG. 1). The fin 34 is formed of a highly thermally conductive material and serves as a heat dissipater of the red color laser light source apparatus 2 to aid heat dissipation of the red color laser light source apparatus 2. The fin 34 is connected to the red color laser light source apparatus 2. Heat generated from the red color laser light source apparatus 2 is thus transferred to the fin 34. The fin 34 is cooled by the cooling air released from the cooling fan 23. Accordingly, it is possible to facilitate the heat dissipation of the red color laser light source apparatus 2. Further, as shown in FIG. 4, the fin 34 is configured to increase a heat dissipation area (surface area), which makes it possible to receive the cooling air from the cooling fan 23 over a larger area. Accordingly, the heat dissipation property of the red color laser light source apparatus 2 can be improved.

The fin 34 is L-shaped and is configured with the fin bottom surface 34b and a fitting portion 34a fitting to the red color laser holder 2a. The fitting portion 34a is installed to a fitting hole 39 by use of a screw 50 so as to be tightly attached to the red color laser holder 2a. The fitting portion 34a also acts to dissipate heat of the red color laser light source apparatus 2. The fin bottom surface 34b is in contact with a case bottom of the tilted portion 30 shown in FIG. 3 via a heat conductive sheet (not shown in the drawings) and the like. Thus, the heat generated in the red color laser light source apparatus 2 is dissipated to the exterior not only with the cooling air sent in by the cooling fan 23 but also via the case bottom of the tilted portion 30. Thereby, the heat dissipation property of the red color laser light source apparatus 2 can be further improved.

Although not shown in FIG. 4, as shown in FIG. 3, guides 24 may be further provided at edges of the fin bottom surface 34b, the guides 24 opposing side surfaces of the cooling fan 23 except the side surfaces facing the image display apparatus main body 100. The guides 24 are formed of a material having a desirable thermal conductivity (for example, metal such as aluminum). In such a case, heat generated in the red color laser light source apparatus 2 attached to the red color laser holder 2a shown in FIG. 4 is transferred to the guides 24 (see FIG. 3) of the fin 34 shown in FIG. 3 via the fitting portion 34a and the bottom surface 34b of the fin 34. Then, the heat is dissipated by the cooling air released from the cooling fan 23. In other words, it is expected that the heat dissipation of the red color laser light source apparatus 2 shown in FIG. 4 will be further facilitated.

The red color laser holder 2a and the fin 34 are provided as separate members but may be integrally provided to improve thermal conductivity. When integrally provided, it becomes easier to dissipate heat of the red color laser light source apparatus 2. As described above, outside air is directly introduced to the fin 34, which is the heat dissipater of the red color laser light source apparatus 2; it is thereby possible to more effectively perform heat dissipation. The cooling air (see FIG. 3) taken in by the cooling fan 23 through the plurality of air inlet ports 21a from the exterior of the image display apparatus 10 in the direction of the arrow A is divided into two flow passages: one flow passage extending from an arrow B to an arrow C, and to an arrow D; and the other flow passage extending to an arrow E, as shown in FIG. 5.

In the flow passage extending from the arrow B to the arrow C, and to the arrow D, the fin 34 serves as a heat dissipater of the red color laser light source apparatus 2 to aid heat dissipation of the red color laser light source apparatus 2. Further, a fin 35 is a heat dissipater of the green color laser light source apparatus 1 to aid heat dissipation of the green color laser light source apparatus 1. Similar to the fin 34, the fin 35 has a configuration in which a heat dissipation area (surface area) becomes larger, thereby improving the heat dissipation property of the green color laser light source apparatus 1. As described above, each fin facilitates heat dissipation of each laser light source apparatus. In addition, each fin is formed of a highly thermally conductive material.

On the other hand, in the flow passage extending to the arrow E, the fin 36 (described in detail later) acts as a heat dissipating member and is formed of a highly thermally conductive material. The fin 36 is a heat dissipater of the image display apparatus main body 100 to aid heat dissipation of the image display apparatus main body 100 (the laser light source apparatuses 1 to 3 of each color, in particular).

Next, heat dissipation paths of the laser light source apparatuses 1 to 3 of each color will be described in detail with reference to FIG. 5. Further, based on these heat dissipation paths, a description is provided for an improvement in the heat dissipation property of the image display apparatus 10 in the present embodiment. First, heat generated in a heat generator (semiconductor laser emitting infrared fundamental laser light, for example) of the green color laser light source apparatus 1 (see FIG. 1) is transferred to the green color laser holder 1a. The heat transferred to the green color laser holder 1a is dissipated from a surface that is in contact with a cooling air passage. Further, the fin 35 has a low temperature, cooled by cooling air. The heat transferred to the interior of the case 200 (see FIG. 1) is thus easily transferred to the fin 35. Then, the heat transferred to the fin 35 is dissipated by the cooling air passing through the flow passage extending from the cooling fan 23 to the arrow B, to the arrow C, and to the arrow D.

Heat generated in a heat generator (semiconductor laser emitting red color laser light, for example) of the red color laser light source apparatus 2 (see FIG. 1) is first transferred to the red color laser holder 2a. The heat transferred to the red color laser holder 2a is transferred to the fin 34. Since the fin 34 is provided in a cooling air passage, the heat transferred to the fin 34 is absorbed by cooling air. A flow passage of the cooling air may be mainly the flow passage extending from the cooling fan 23 to the arrow E. Alternatively, the flow passage extending from the cooling fan 23 to the arrow B, to the arrow C, and to the arrow D may be used together with the flow passage extending from the cooling fan 23 to the arrow E.

Heat generated in a heat generator (semiconductor laser emitting blue color laser light, for example) of the blue color laser light source apparatus 3 (see FIG. 1) is transferred to the blue color laser holder 3a. Since the blue color laser holder 3a is provided in a cooling air passage, the heat transferred to the blue color laser holder 3a is absorbed by cooling air passing through the flow passage extending from the cooling fan 23 to the arrow B, to the arrow C, and to the arrow D. In addition, as a matter of course, a fin may be provided to the blue color laser holder 3a. Further, the fin 34 and the fin 35 may be configured to be in a pinholder (frog) state or a layered state, and are not limited to a specific shape.

Further, the case 200 (see FIG. 1) and the fin 36 also are used for the heat dissipation of the laser light source apparatuses 1 to 3 of each color (see FIG. 1). Since the laser holders 1a to 3a of each color are in contact with the case 200, heat generated in the laser light source apparatuses 1 to 3 of each color (see FIG. 1) is transferred to the case 200. Furthermore, the fin 36 is configured to be in contact with the case 200. Thus, the fin 36 performs heat dissipation of the case 200, to which the heat generated in the laser light source apparatuses 1 to 3 of each color (see FIG. 1) has been transferred. In addition, both a tall portion 36a and a short portion 36b are in contact with the tilted portion 30. In other words, the fin 36 can dissipate heat via the tilted portion 30 as well.

Next, a cooling air passage (heat dissipation flow passage) formed between the inlet ports 21a (see FIG. 3) and the exhaust ports 31a and 32a will be described with reference to FIG. 5. The cooling air passage is a path in which air travels from the inlet ports 21a (see FIG. 3) to the exhaust ports 31a and 32a, the air being taken in through the inlet ports 21a and being exhausted through the exhaust ports 31a and 32a.

The cooling fan 23 installed in the tilted portion 30 sucks in outside air through the inlet ports 21a (see FIG. 3), and takes in cooling air in the arrow A direction (see FIG. 3). The cooling air from the cooling fan 23 directly cools the fin 34 connected with the red color laser holder 2a, thereby cooling heat generated from the red color laser light source apparatus 2. As described earlier, the present embodiment has two cooling air passages. In the first cooling air passage, air is guided from the cooling fan 23 to the arrows B, C, and D in this order, and is eventually exhausted through the exhaust ports 31a. In the second cooling air passage, air is guided from the cooling fan 23 to the arrow E, and is eventually exhausted through the exhaust ports 32a. The heat dissipaters of the laser light source apparatuses 1 to 3 of each color provided in these two cooling air passages are cooled by the cooling air. Thus, heat dissipation of the laser light source apparatuses 1 to 3 of each color is facilitated. In other words, an increase in temperature of the laser light source apparatuses 1 to 3 of each color is inhibited.

Hereinafter, the two cooling air passages are described. As described above, the cooling fan 23 sucks in the cooling air in the direction of the arrow A (see FIG. 3). After cooling the fin 34, the cooling air is then guided by the guides 24 in the directions of the arrow B and the arrow E. The cooling air passage is divided into the direction of the arrow B and the direction of the arrow E. Herein, the cooling air passage proceeding in the direction of the arrow B is referred to as a first divided passage, and the cooling air passage proceeding in the direction of the arrow E is referred to as a second divided passage.

First, a description is provided for a case where cooling air proceeds in the direction of the arrow B (the first divided passage). A guide 37 is provided in the interior of the tilted portion 30. The guide 37 guides the cooling air guided in the direction of the arrow B to the direction of the arrow C. Thereby, the cooling air first reaches and cools the fin 35. Then, the cooling air cools the blue color laser light source apparatus 3 (see FIG. 1) housed in the blue color laser holder 3a provided between the projecting lens 4 (see FIG. 3) and the fin 35. The cooling air is then exhausted through the exhaust ports 31a (in the direction of the arrow D). As described above, the first cooling air passage is formed in the order of the arrows A, B, C, and D. The cooling air absorbs the heat of components provided in the first cooling air passage.

Next, a description is provided for a case where cooling air proceeds in the direction of the arrow E (the second divided passage). The cooling air proceeding in the direction of the arrow E is the cooling air guided to the exhaust ports 32a. The cooling air cools the fin 36 provided in the air passage, thereby facilitating heat dissipation of the image display apparatus main body 100 via the case 200 (see FIG. 1) having the fin 36. The cooling air absorbs the heat of the fin 36 and is thereafter exhausted through the exhaust ports 32a.

As described above, the first cooling air passage is formed in the order of the arrows A, B, C, and D, and the second cooling air passage is formed in the order of the arrows A and E. Accordingly, the cooling air flowing in the first cooling air passage cools the heat dissipater (the fin 34) of the red color laser light source apparatus 2 (see FIG. 1) housed in the red color laser holder 2a, the heat dissipater (the fin 35) of the green color laser light source apparatus 1 (see FIG. 1) housed in the green color laser holder 1a, and the heat dissipater (the blue color laser holder 3a) of the blue color laser light source apparatus 3 (see FIG. 1) housed in the blue color laser holder 3a in this order. The cooling air flowing in the second cooling air passage cools the heat dissipater (the fin 34) of the red color laser light source apparatus 2 and the fin 36.

In other words, in dissipating the heat of the laser light source apparatuses of each color, priority is given to the red color laser light source apparatus 2 (see FIG. 1) housed in the red color laser holder 2a, the green color laser light source apparatus 1 (see FIG. 1) housed in the green color laser holder 1a, and the blue color laser light source apparatus 3 (see FIG. 1) housed in the blue color laser holder 3a in this order. Thereby, it is possible to inhibit deterioration in image quality of the image display apparatus 10. Further, as described later, the green color laser light source apparatus 1 generally requires the greatest amount of electric current. In addition, the green color laser light source apparatus 1 generates the greatest amount of heat because of low efficiency in electro-optical conversion.

Thus, in the present embodiment, the cooling air passage is formed in the image display apparatus 10 such that cooling of the heat dissipater of the green color laser light source apparatus 1 is given the next priority after cooling of the heat dissipater of the red color laser light source apparatus 2, which generally has the poorest temperature characteristics among the laser light source apparatuses of each color. In other words, the green color laser light source apparatus 1 is given priority in cooling over the blue color laser light source apparatus 3. Specifically, the present invention is configured such that cooling air cools the heat dissipater (the fin 35) of the green color laser light source apparatus 1 before absorbing the heat of the heat dissipater of the blue color laser light source apparatus 3. Therefore, it is also possible to exert a similar effect by arranging the heat dissipater of the blue color laser light source apparatus 3 on a downstream side in the cooling air passage with respect to the heat dissipaters of the green color laser light source apparatus 1 and the red color laser light source apparatus 2.

In other words, because the heat dissipater of the blue color laser light source apparatus 3 having desirable temperature characteristics is arranged downstream in the cooling air passage, even when affected by waste heat of the other laser light sources positioned upstream, the blue color laser light source apparatus 3 can keep a change in laser property to a minimum because of the desirable temperature characteristics thereof. In addition, by arranging the heat dissipater of the blue color laser light source apparatus 3 on a downstream side in the cooling air passage, it is possible to prevent heat from diffusing toward the upstream side and to keep an impact of the heat generated by the blue color laser light source apparatus 3 (see FIG. 1), although the impact is smaller than that of others, to a minimum on the green color laser light source apparatus 1 (see FIG. 1) generating a great amount of heat and the red color laser light source apparatus 2 (see FIG. 1) having undesirable temperature characteristics.

Further, in a case where the heat dissipater of the blue color laser light source apparatus 3 is provided on the downstream side in the cooling air passage, depending on an arrangement of the laser light source apparatus, a similar effect as described above is obtained even when the cooling air passage is divided into two paths. One cooling air passage extends in the order of the inlet port, the cooling fan, the red color laser light source apparatus 2, the blue color laser light source apparatus 3, and the exhaust port. The other cooling air passage extends in the order of the inlet port, the cooling fan, the green color laser light source apparatus 1, the blue color laser light source apparatus 3, and the exhaust port.

Likewise, a similar effect as described above is also obtained when the cooling air passage is divided into two paths: one cooling air passage extending in the order of the inlet port, the cooling fan, the red color laser light source apparatus 2, and the exhaust port; and the other cooling air passage extending in the order of the inlet port, the cooling fan, the green color laser light source apparatus 1, and the exhaust port.

Figure 6:
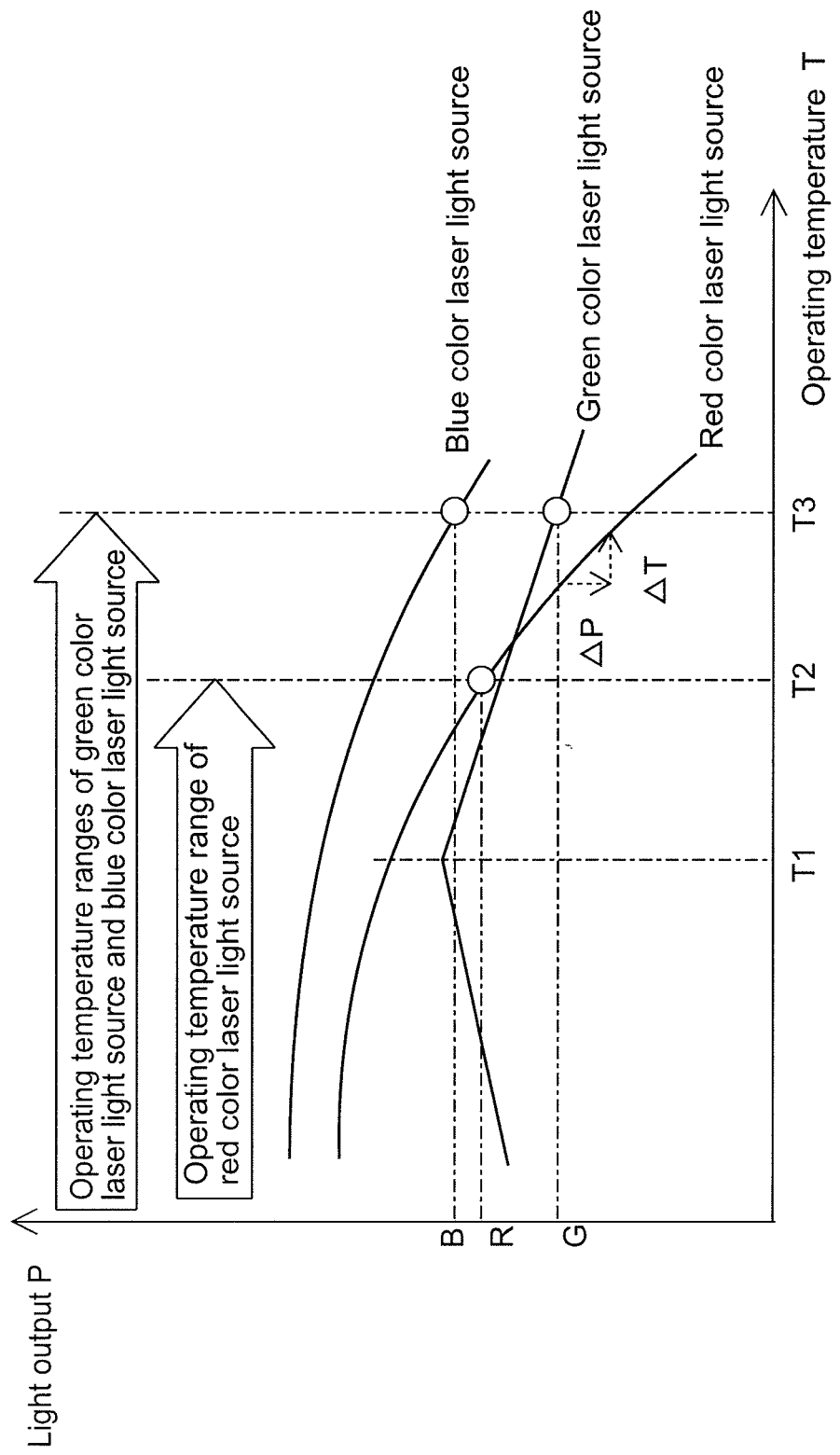
FIG. 6 illustrates a relationship between operating temperature and light output of laser light source apparatuses of each color according to the embodiment of the present invention.

Hereinafter, a reason for configuring the order of the heat dissipaters of the laser light source apparatuses of each color as above is described in detail with reference to FIG. 6. FIG. 6 illustrates a relationship between operating temperature of the laser light source apparatuses of each color and light output in the embodiment of the present invention. First, it is described in greater detail why the red color laser light source apparatus 2 (see FIG. 1) is given first priority in dissipating heat. As described earlier, in general, the red color laser light source apparatus 2 has the poorest temperature characteristics among the laser light source apparatuses 1 to 3 of each color. The temperature characteristics here are a property indicating a temperature range in which the laser light source apparatuses of each color can obtain minimally required or greater light output.

The laser light source apparatuses 1 to 3 of each color each have different temperature characteristics. Referring to the characteristics diagram shown in FIG. 6, basically, temperature of the laser light source apparatuses 1 to 3 of each color increases on a high temperature side; and accordingly, light output decreases. Among them, the light output of the red color laser light source apparatus 2 particularly quickly decreases. Thus, an upper limit of the operating temperature of the red color laser light source apparatus 2 is lower than that of the other laser light source apparatuses. Therefore, it is desirable that an increase in temperature of the red color laser light source apparatus 2 be preferentially inhibited.

Accordingly, as shown in FIG. 5, the present embodiment has the fin 34 serving as the heat dissipater of the red color laser light source apparatus 2 (see FIG. 1) housed in the red color laser holder 2a in a vicinity of the cooling fan 23 of the tilted portion 30. In other words, the fin 34 as the heat dissipater of the red color laser light source apparatus 2 is provided on the most upstream side among the heat dissipaters of the laser light source apparatuses 1 to 3 of each color provided in the cooling air passage. Thereby, the cooling air guided to the interior of the tilted portion 30 cools the fin 34 serving as the heat dissipater of the red color laser light source apparatus 2 (see FIG. 1) housed in the red color laser holder 2a before cooling the fin 35, the fin 36, and the blue color laser holder 3a, the fin 35 serving as the heat dissipater of the green color laser light source apparatus 1 (see FIG. 1) housed in the green color laser holder 1a, and the fin 36 and the blue color laser holder 3a serving as the heat dissipaters of the image display apparatus main body 100 (see FIG. 1).

Specifically, the cooling air cools the fin 34 before absorbing the heat of the fin 35, the fin 36, and other members in the tilted portion 30. Further, the fin 34 is cooled by a great amount of cooling air before the cooling air is divided into the arrow B and the arrow E. With the cooling air passage being configured in this way, the heat dissipater (the fin 34) of the red color laser light source apparatus 2 (see FIG. 1) is preferentially cooled. Thus, it is possible to preferentially inhibit a decrease in the light output of the red color laser light source apparatus 2 (see FIG. 1) having the poorest temperature characteristics. Therefore, the image display apparatus main body 100 (see FIG. 1) can stably output an image of high quality.

Next, again with reference to FIG. 6, a reason why heat dissipation of the green color laser light source apparatus 1 (see FIG. 1) is given priority next after the red color laser light source apparatus 2 (see FIG. 1) will be described. As indicated in FIG. 6, the temperature characteristics of the green color laser light source apparatus 1 (see FIG. 1) and the blue color laser light source apparatus 3 (see FIG. 1) have almost the same upper limit on the operating temperature of the laser light sources. However, in general, the green color laser light source apparatus 1 (see FIG. 1) requires the greatest amount of electric current among the laser light source apparatuses 1 to 3 of each color. In addition, as described above, the green color laser light source apparatus 1 (see FIG. 1) mainly outputs green color laser light by converting infrared fundamental laser light. In other words, laser light emitted from the semiconductor laser passes various elements (an SHG element, for example) before being converted to green color laser light. Thereby, loss of light occurs, and thus electro-optic conversion efficiency of the green color laser light source apparatus 1 (see FIG. 1) is lower than that of the red color laser light source apparatus 2 (see FIG. 1) and the blue color laser light source apparatus 3 (see FIG. 1). In other words, the green color laser light source apparatus 1 requires a greater amount of electric power to output a predetermined level of light than the red color laser light source apparatus 2 (see FIG. 1) and the blue color laser light source apparatus 3 (see FIG. 1).

Thus, among the laser light source apparatuses of each color, in general, the green color laser light source apparatus 1 (see FIG. 1) generates the greatest amount of heat. Therefore, there is a possibility that the heat generated by the green color laser light source apparatus 1 (see FIG. 1) is transferred to the protrusion 201 (see FIG. 1) (that is, transferred to the case 200 (see FIG. 1)), thereby facilitating an increase in temperature of the red color laser light source apparatus 2 (see FIG. 1) and the blue color laser light source apparatus 3 (see FIG. 1). At this time, a decrease in light output of the red color laser light source apparatus 2 (see FIG. 1) and the blue color laser light source apparatus 3 (see FIG. 1) is facilitated.

Accordingly, in the present embodiment, as shown in FIG. 5, the image display apparatus 10 and the cooling air passage are configured such that the green color laser light source apparatus 1 (see FIG. 1) is preferentially cooled next after the red color laser light source apparatus 2 (see FIG. 1). In other words, the green color laser light source apparatus 1 (see FIG. 1) is given priority in cooling over the blue color laser light source apparatus 3 (see FIG. 1). Specifically, the heat dissipater (the fin 35) of the green color laser light source apparatus 1 (see FIG. 1) is cooled by the cooling air before the cooling air absorbs the heat of the blue color laser light source apparatus 3 (see FIG. 1).

Further, as shown in FIG. 5, an air blower, three laser light sources, and the like are installed inside the rotationally movable body (the tilted portion 30). Thus, even in a case where the image display apparatus is installed in a personal computer (PC, hereinafter) and the like, and is used while being rotated, the rotationally movable body is positioned outside. Thus, the rotationally movable body can suck in and use outside air without wasting it at any rotated position. Further, compared with a device in which an air blower is installed in the fixed portion 20 to configure an air passage to take cooling air into the tilted portion 30, a distance of the cooling air passage is shortened without considering a connection between the cooling air passage of the fixed portion 20 and the cooling air passage of the tilted portion 30. Cooling can thus be efficiently performed. Thus, even when the image display apparatus is operated for a long period of time, a decrease in light output of the green color laser light source apparatus 1 and the red color laser light source apparatus 2 is inhibited, thereby making it possible to stably obtain laser light output of three colors.

Further, the air blower can cool the heat dissipater of the red color laser light source before absorbing the heat of the heat dissipaters of the green color laser light source and the blue color laser light source. Specifically, the heat dissipater of the red color laser light source having the poorest temperature characteristics is most preferentially cooled. Thereby, heat dissipation of the red color laser light source is especially facilitated. That is, an increase in temperature of the red color laser light source is especially inhibited. Accordingly, even when the image display apparatus is operated for a long period of time, a decrease in light output of the red color laser light source is inhibited, thereby making it possible to stably obtain laser light output of three colors.

In addition, since the inlet ports and the air blower are installed inside the case that is integrally provided with the image display apparatus main body, outside air can be efficiently used for heat dissipation without any waste, and the cooling air passage can be shortened. Thereby, heat dissipation of the heat dissipaters of the laser light sources of each color can be successfully performed.

Figure 7:
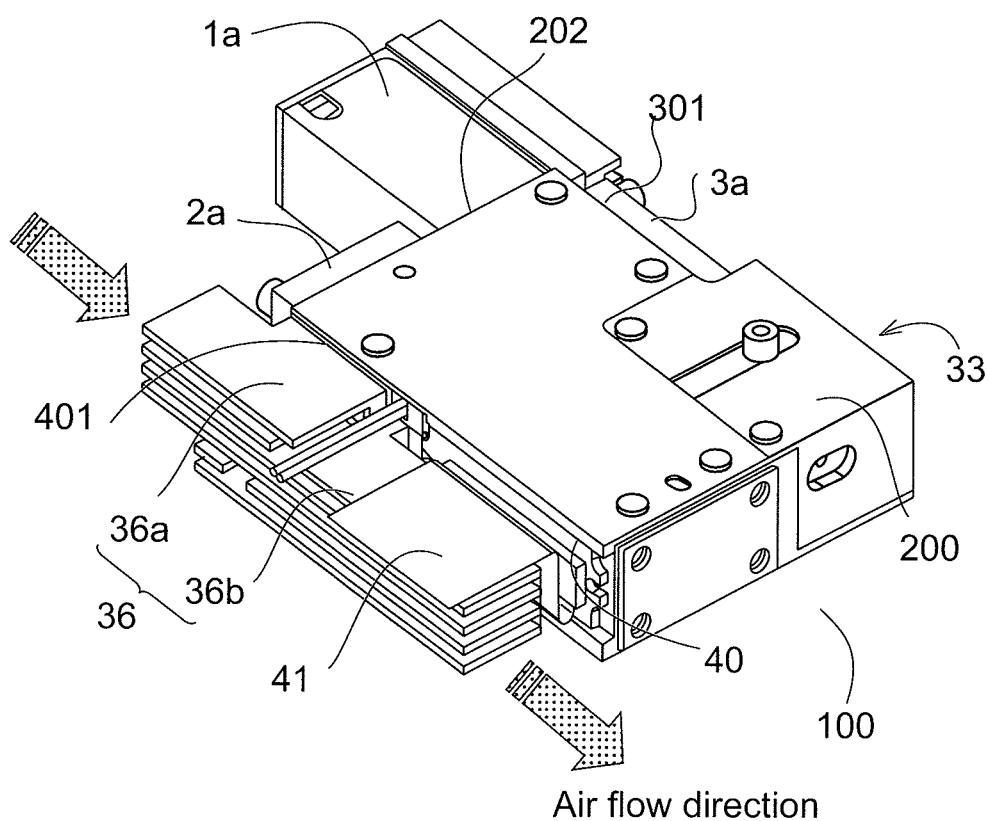
FIG. 7 illustrates an installation of a cooling fin in the image display apparatus according to the embodiment of the present invention.
Figure 8:
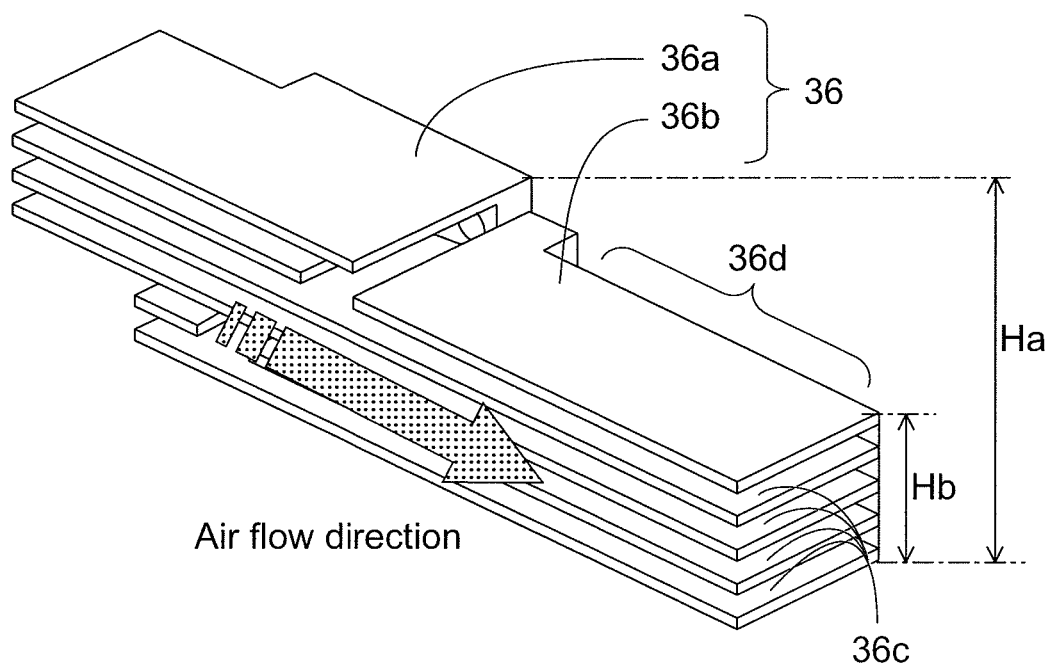
FIG. 8 is a perspective view of the cooling fin of the image display apparatus according to the embodiment of the present invention.

Next, a detailed explanation is provided for the above-described fin 36 of the present embodiment with reference to the drawings. FIG. 7 illustrates an installation of a cooling fin of the image display apparatus in the embodiment of the present invention. FIG. 8 is a perspective view of the cooling fin of the image display apparatus in the embodiment of the present invention. As shown in FIG. 7, the blue color laser holder 3a is provided on the side surface 301 to which the projection mouth 33 of the image display apparatus main body 100 is provided. The green color laser holder 1a and the red color laser holder 2a are provided on the side surface 202, which is orthogonal to the side surface 301.

In addition, the fin 36 is provided to a side surface 401 on an opposite side to the side surface 301 having the projection mouth 33 so as to be in contact with the case 200 (also see FIG. 1) of the image display apparatus main body 100. The case 200 of the image display apparatus main body 100 and the fin 36 are formed of aluminum or the like having good thermal conductivity and a light weight. The fin 36 is provided so as to be located in one path of the air passages formed in the tilted portion 30 (the arrow E in FIG. 5 or the arrow in FIG. 7).

Thus, with the fin 36 being directly attached to the case 200 of the image display apparatus main body 100, the heat transferred from the laser holders of the laser light source apparatuses 1 to 3 of each color to the case 200 of the image display apparatus main body 100 can be quickly transferred to the fin 36. The fin 36 can easily dissipate the heat transferred from the laser light source apparatuses of each color using the cooling air (the arrow E in FIG. 5) taken in by the cooling fan 23 (see FIG. 5).

Further, a controlling board 40 is installed to a portion of the side surface 401, the controlling board 40 controlling and driving the spatial light modulator 9 (see FIG. 1) of the image display apparatus main body 100. From the controlling board 40, a flat cable 41 that communicates with an outside circuit is pulled out. In order to prevent noise contamination and the like, the distance between the spatial light modulator 9 and the controlling board 40 and the length of the flat cable 41 are configured to be as short as possible.

Next, a shape of the fin 36 is described with reference to FIG. 8. As shown in FIG. 8, the fin 36 is integrally formed and is provided with three features. The first feature is that the fin 36 is provided with a fin groove 36c along an air flow direction of the cooling air passage (also see the arrow E in FIG. 5). Further, the fin groove 36c has a multi-tier structure in a direction perpendicular to the air flow direction of the cooling air passage. With the fin groove 36c being provided, a heat dissipation area of the fin 36 can be significantly increased, and thus an effect of heat dissipation via the fin 36 can be increased. Further, since the fin groove 36c extends in the air flow direction of the cooling air passage, cooling air is hardly blocked by anything in the air flow direction, and pressure loss as described above can be further decreased. An advantage is thus provided that a flow of the cooling air can be facilitated.

Further, although the fin groove 36c has a multi-tier structure in the direction perpendicular to the air flow direction of the cooling air passage, it may have a single-tier structure. However, the multi-tier structure can provide a larger heat dissipation area on the fin 36 than the single-tier structure does.

The second feature is that the fin 36 has uneven height in the air flow direction of the cooling air passage (also see the arrow E in FIG. 5 and the arrow in FIG. 7). In FIG. 8, the difference of height is only one level, but it is not limited to this, and multiple levels of difference may be provided. The fin 36 has the tall portion 36a and the short portion 36b, providing a stair-like structure with different levels. The short portion 36b is provided to secure a space for electrically connecting the image display apparatus main body 100 to the spatial light modulator 9 (see FIG. 1), for example.

Further, the spatial light modulator 9 is electrically connected to the controlling board 40 (see FIG. 7) so that the controlling board 40 can control the spatial light modulator 9. Thereby, the PC 300 can form a desired output image. In other words, the image display apparatus main body 100 can project an image that the PC 300 intends to output.

Specifically, the short portion 36b is provided on a line connecting the projection mouth 33 and the spatial light modulator 9 (see FIG. 1) behind the spatial light modulator 9. A difference in height is formed such that a height Ha of the tall portion 36a on the upstream side in the air flow direction is higher than a height Hb of the short portion 36b on the downstream side. Thereby, the flat cable 41 coming out from the controlling board 40 can be pulled out to the exterior without being twisted and with no difficulty. Thus, unnecessary stress is prevented.

Further, because the downstream side of the cooling air passage is widened, it is possible to reduce the pressure loss of the cooling fan 23, and thus there is an advantage that the flow of the cooling air is facilitated. Specifically, by increasing the size of an air passage, which is remotely positioned from the cooling fan 23, on the downstream side of the cooling air passage, it is possible to reduce resistance of the cooling air flow. Thereby, it is possible to reduce the number of rotations of the cooling fan 23, which reduces the occurrence of noise and vibration from the fan.

The third feature is that the fin 36 also has an uneven surface on the case 200 side. Specifically, a surface of the tall portion 36a on the case 200 side is entirely in contact with the case 200 (see FIG. 1). On the other hand, only a portion of a surface of the short portion 36b on the image display apparatus main body 100 side is in contact with the case 200, the portion of the contacting surface being on the side close to the tall portion 36a.

An area on which the short portion 36b and the case 200 are in contact with each other is limited in order to not actively cool the spatial light modulator 9. It is not preferable to simply lower the temperature of the spatial light modulator 9 like the laser light source apparatuses 1 to 3 of each color. It is preferable to maintain the temperature within a predetermined range.

For example, when the temperature of the spatial light modulator 9 becomes 50° C. or more, there is a possibility that unintentional burn-in occurs in an image projected from the projecting lens 4. Further, when the temperature of the spatial light modulator 9 becomes substantially between 5° C. and 10° C., reflectance of the spatial light modulator 9 decreases, which affects the quality of the projected image.

Thus, the image display apparatus 10 of the present embodiment has a non-contact space 36d in which the short portion 36b is not in contact with at least a portion of the case 200 that opposes the spatial light modulator 9 in order to not actively cool the spatial light modulator 9. Thereby, it is possible to inhibit the spatial light modulator 9 from being unnecessarily cooled. Further, the non-contact space 36 (the portion that is not in contact) can be used for a wire processing (storing an excessive cable or cushioning against tension of a cable) of the flat cable 41 pulled out from the controlling board 40 (see FIG. 7), and the like.

Further, a position of the surface on which the short portion 36b and the case 200 are not in contact with each other may be modestly shifted depending on an installation position of the spatial light modulator 9. However, the arrangement in the present embodiment is the best due to the arrangements of the laser light source apparatuses 1 to 3 of each color, the spatial light modulator 9, and the projection mouth 33 (see FIG. 1), and a desire for miniaturization of the tilted portion 30 (see FIG. 2).

Further, although the case 200 (see FIG. 1) and the fin 36 are described as separate members in the present embodiment, they may be integrated in order to increase thermal conductivity. With those members being integrated, heat dissipation of the case 200, that is, the laser light source apparatuses 1 to 3 of each color, is facilitated.

Figure 9:
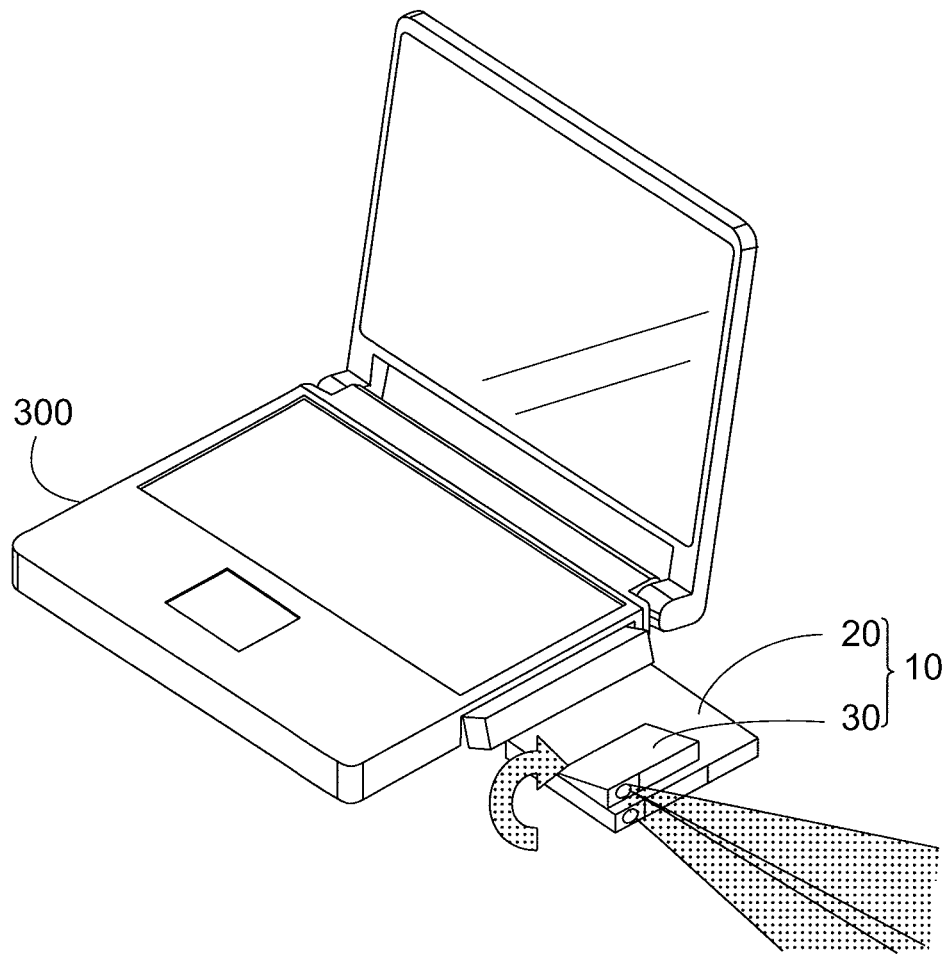
FIG. 9 illustrates an example in which the image display apparatus according to the embodiment of the present invention is incorporated in an electronic device.

FIG. 9 illustrates an example in which the image display apparatus in the embodiment of the present invention is incorporated in an electronic device. The image display apparatus 10 of the present embodiment may be used as a standalone, but may be installed in the PC 300, which is an electronic device, as shown in FIG. 9. The image display apparatus 10 can be inserted to and removed from the PC 300 as needed, and can project output on a display of the PC 300 onto a screen, a wall, and the like. Thus, the output on the display of the PC 300 can be easily output on a large screen without any separate image display apparatus connected to the PC 300 with a wire or the like.

The tilted portion 30 houses the cooling fan 23 and members required as a display apparatus such as the image display apparatus main body 100 and the like. Thus, when the image display apparatus is incorporated in the PC 300, for example, the tilted portion 30 may be pulled out to only the minimally required portion. In such a case, there is an advantage that a large space is not required for operation. Further, a position to attach the image display apparatus 10 to the PC 300 is not limited to a right surface of the PC 300 as shown in FIG. 9. The image display apparatus 10 may be attached to a left surface, a rear surface, a front surface, or the like of the PC 300.

When the image display apparatus 10 is incorporated in the PC 300 (electronic device), the tilted portion 30 may be provided at least protruding to the exterior of the PC 300 so as to be freely rotatable. Thus, at least a portion of the fixed portion 20 needs to be fixed to the PC 300. The fixed portion 20 may be fixed to the PC 300 with its surface opposing the side surface 31 (see FIG. 2). Further, examples of the electronic device other than the PC 300 include a television, a display, an optical disc player, a portable optical disc player, and the like. Anything that projects an image may be included. Further, in order to externally project information of an electrical device (for example, home electrical appliance such as a refrigerator and a washing machine), the image display apparatus 10 may be incorporated in the electrical device.

As described above, in the image display apparatus of the present embodiment, in consideration of the temperature characteristics and the amount of heat generated in the laser light source apparatuses 1 to 3 of each color, a fin, which is a heat dissipater, is properly arranged and the cooling air passage is formed. Thus, deterioration in image quality of the image display apparatus due to a long period of use is inhibited. In other words, the image display apparatus can inhibit deterioration in the quality of a projected image and can stably output an image of high quality.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An image display apparatus comprising:
   a first case, the first case holding a heat dissipater;
   a second case housing the first case;
   a first, a second, and a third light source being held by the first case and each emitting light having an emission wavelength different from one other;
   a projection mouth externally irradiating light output from the first to the third light sources;
   an air passage being provided inside the second case and being capable of guiding air that cools an interior of the second case,
   wherein the heat dissipater held by the first case is positioned in the air passage,
   wherein the heat dissipater has a fin shape; and
   a direction of a groove of the fin is aligned with an air flow direction of the air passage, and wherein the heat dissipater has different height at least at two portions along the air passage.

2. The image display apparatus according to claim 1, wherein the height of the heat dissipater is set to be short on a downstream side in the air passage.

3. The image display apparatus according to claim 2, wherein a flat cable is pulled out from a short portion that is configured to be short in the heat dissipater.

4. The image display apparatus according to claim 2, wherein at least one of the first, the second, and the third light sources is a green color laser light source;
   the green color laser light source has at least a spatial light modulator; and
   the spatial light modulator is provided behind the short portion, which is configured to be short in the heat dissipater.

5. The image display apparatus according to claim 2, wherein the heat dissipater is a portion being short in the heat dissipater; and
   a portion of a surface of the heat dissipater opposing the second case is not in contact with the second case.

6. The image display apparatus according to claim 1, wherein the groove of the fin is configured to have multiple tiers in a direction perpendicular to the air flow direction of the cooling air passage.

7. The image display apparatus according to claim 1, wherein the first case and the second case are provided to a fixed portion in a state being pivotable on a hinge.

8. The image display apparatus according to claim 1, wherein the first case has the projection mouth; and
   the heat dissipater is provided to a surface opposite to a surface of the first case on which the projection mouth is provided.

9. An image display apparatus comprising:
   a first case, the first case holding a heat dissipater;
   a second case housing the first case;
   a blue color laser light source, a red color laser light source, and a green color laser light source held by the first case, the green color laser light source having a wavelength conversion element;
   a projection mouth externally irradiating light output from the blue color laser light source, the red color laser light source, and the green color laser light source;
   an air passage provided inside the second case and capable of guiding air that cools an interior of the second case,
   wherein the heat dissipater has a fin shape and is provided to a surface opposite to a surface on which the projection mouth of the first case is provided; and
   a direction of a groove of the fin is aligned with an air flow direction of the air passage, and
   wherein the heat dissipater has different height at least at two portions along the air passage.

* * * * *